US012246907B2

(12) United States Patent
Cotte

(10) Patent No.: US 12,246,907 B2
(45) Date of Patent: Mar. 11, 2025

(54) PACKAGE COMPRISING AN IMAGE SENSOR FOR CAPTURING IMAGES OF AN OBJECT INSIDE THE PACKAGE, AND AN EXTERNAL SCREEN FOR DISPLAYING THE IMAGES CAPTURED BY THE SENSOR

(71) Applicant: PA.COTTE SA, Pully (CH)

(72) Inventor: Pierre-Alain Cotte, Amberg (DE)

(73) Assignee: PA.COTTE SA, Pully (CH)

( * ) Notice: Subject to any disclaimer, the term of this patent is extended or adjusted under 35 U.S.C. 154(b) by 0 days.

(21) Appl. No.: 17/912,125

(22) PCT Filed: Mar. 11, 2021

(86) PCT No.: PCT/EP2021/056279
§ 371 (c)(1),
(2) Date: Sep. 16, 2022

(87) PCT Pub. No.: WO2021/185679
PCT Pub. Date: Sep. 23, 2021

(65) Prior Publication Data
US 2023/0040344 A1    Feb. 9, 2023

(30) Foreign Application Priority Data

Mar. 18, 2020    (FR) ...................................... 2002659

(51) Int. Cl.
*B65D 85/18*    (2006.01)
*H04N 23/63*    (2023.01)
*H04N 23/66*    (2023.01)

(52) U.S. Cl.
CPC .......... *B65D 85/187* (2013.01); *H04N 23/63* (2023.01); *H04N 23/66* (2023.01); *B65D 2203/10* (2013.01); *B65D 2203/12* (2013.01)

(58) Field of Classification Search
CPC .............. B65D 85/187; B65D 2203/10; B65D 2203/12; H04N 23/63; H04N 23/66
(Continued)

(56) References Cited

U.S. PATENT DOCUMENTS

2014/0124398 A1*  5/2014  Learmonth ............... G06K 7/12
                                                          206/459.1
2017/0286905 A1* 10/2017  Richardson ........ G06Q 10/0836
(Continued)

FOREIGN PATENT DOCUMENTS

WO        2016/133609        8/2016

OTHER PUBLICATIONS

English translation of International Preliminary Report on Patentability as issued by the International Searching Authority, dated Sep. 20, 2022, for International Patent Application No. PCT/EP2021/056279; 8 pages.
(Continued)

*Primary Examiner* — Rafael A Ortiz
(74) *Attorney, Agent, or Firm* — Faegre Drinker Biddle & Reath LLP

(57) ABSTRACT

A package intended to contain one object, including: a box; a lid which can adopt, with the box, a closed or an open package configuration, a device for detecting the closed or open configurations, one image sensor relating to said object, one electronic display device accessible from the exterior of the package, a computing unit, intended to receive images from the image sensor and to transmit to the electronic display instructions to display said images, and mechanism for triggering the image sensor. The triggering mechanism is presented on an external façade of the package. The computing unit is connected to the detection device and is parameterized to authorize a display of the images from the image sensor in the closed package configuration
(Continued)

and, conversely, prohibit the display in the open package configuration.

10 Claims, 2 Drawing Sheets

(58) Field of Classification Search
USPC .................................................. 206/459.1
See application file for complete search history.

(56) References Cited

U.S. PATENT DOCUMENTS

| 2018/0022540 A1* | 1/2018 | Weyna | B65D 90/48 |
| | | | 206/459.1 |
| 2020/0051015 A1* | 2/2020 | Davis | G06K 19/0723 |

OTHER PUBLICATIONS

International Search Report and Written Opinion issued by the International Searching Authority, dated Apr. 12, 2021, for International Patent Application No. PCT/EP2021/056279; 16 pages.

\* cited by examiner

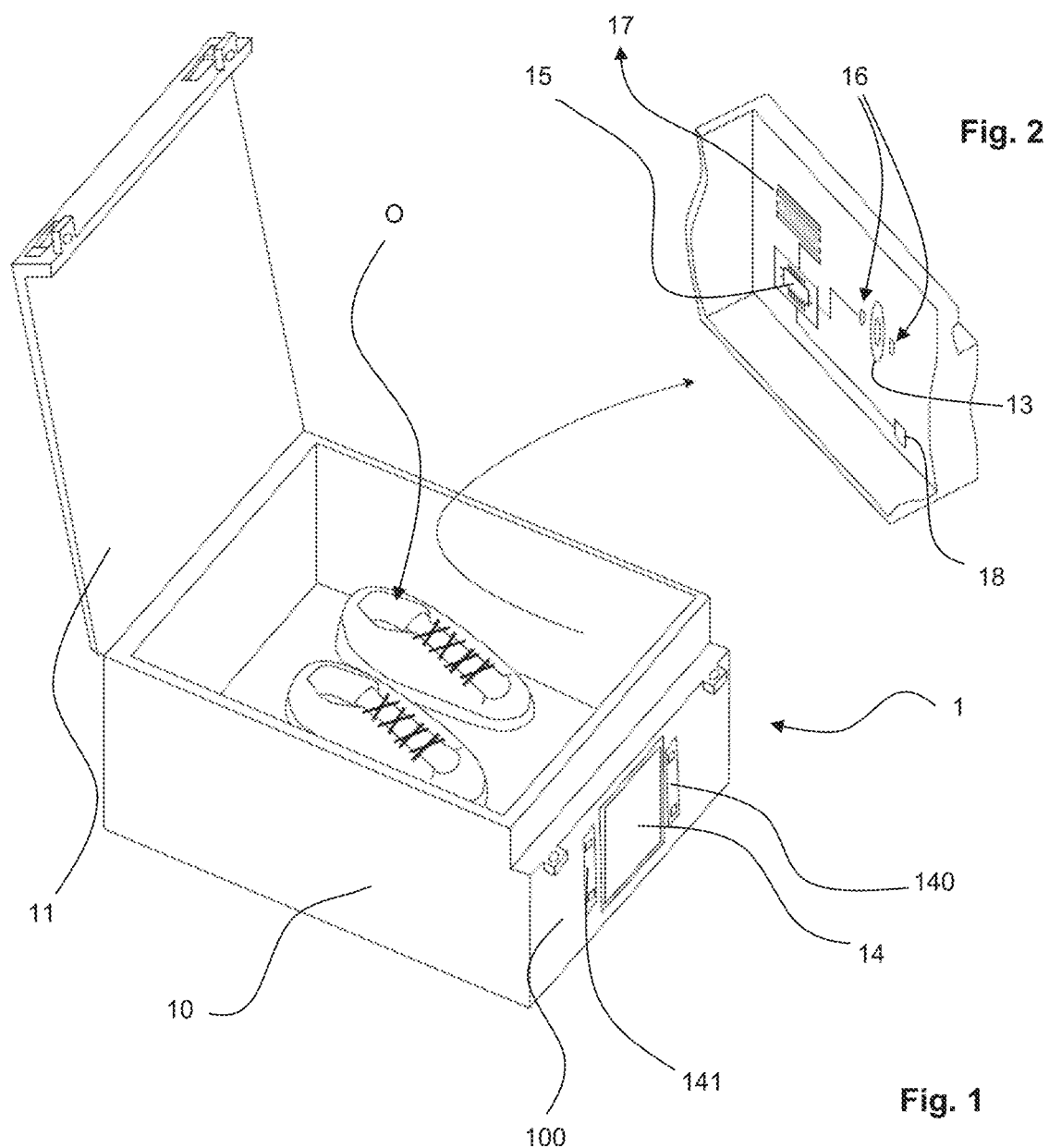

PACKAGE COMPRISING AN IMAGE SENSOR FOR CAPTURING IMAGES OF AN OBJECT INSIDE THE PACKAGE, AND AN EXTERNAL SCREEN FOR DISPLAYING THE IMAGES CAPTURED BY THE SENSOR

CROSS-REFERENCE TO RELATED APPLICATIONS

The present application is a national stage entry of International (PCT) Patent Application Number PCT/EP2021/056279, filed Mar. 11, 2021, which claims priority to French Patent Application Number 2002659, filed Mar. 18, 2020, the complete disclosures of which are expressly incorporated herein by reference.

The field of the invention is that of the design and manufacture of equipment dedicated to logistics.

More specifically, the invention relates to the routing of objects, and particularly the routing of objects generally coming from e-commerce platforms or transferred from one individual to another.

In the field of the invention, the routing of objects by e-commerce platforms very often takes place by arranging the object(s) to be routed in a package provided, for the purposes of routing, with a label having at least one visual code, in particular taking the form of a printed barcode, which allows identifying the package by each of the actors involved in the routing of the package.

Conventionally, for the routing of one or several object(s), the package is shaped by an operator. The object(s) is/are then disposed in the shaped package, then the latter is closed and labeled for routing.

Of course, before being routed, it is common for the packages to be put on hold, and therefore stored in a warehouse. Here again conventionally, the storage of the packages, which can be numerous, is carried out by stacking the packages, this for obvious reasons of space saving.

Currently, among the operations that an operator must carry out in a logistics chain, one of them consists of checking, if necessary, the contents of a package before it is picked from the stock of prepared packages, with a view to initializing its routing.

For that purpose, the operator therefore has, without any other possibility, to open the package to visually check its contents. Of course, due to the stack of the packages as mentioned previously, the manipulation of several packages may be necessary to extract the package to be checked, in order to be able to proceed with its opening (this opening is of course not possible when the package is covered by one or several other package(s)).

It is understood that such an operation, likely to be repeated many times during the same day, is a source of waste of time and economically unprofitable.

In addition to the loss of time caused, the repeated manipulation and handling of the packages involve more or less physical effort (some packages may be heavier than others), which is a source of musculoskeletal disorders.

With regard to the checking of the package by an individual who wishes to ship an object, the person who ships the package may have a doubt on the contents before shipment and wish to check the contents when the package is already closed and maintained closed by various means (adhesive tape, string, glue, etc.). In the presence of such means for maintaining the closure, the person must then undo what he has set up to check the contents, which is of course restrictive and a waste of time.

The objective of the invention is in particular to overcome the drawbacks of the prior art.

More specifically, the objective of the invention is to propose a package that allows visual checking and monitoring of its contents in a simpler and faster manner than what is allowed with the packages of the prior art.

In this sense, the objective of the invention is particularly to provide such a package which facilitates the monitoring of its contents when the package is covered by one or several other package(s).

The objective of the invention is also to provide such a package which allows rapid monitoring of its contents, including when the package is provided with means for maintaining its closure.

These objectives as well as others which will appear later are achieved thanks to a package intended to contain at least one object, comprising:
  a box,
  a lid which can adopt, with the box, a closed package configuration or an open package configuration,
  a device for detecting the closed or open package configurations,
  at least one image sensor relating to said object(s),
  at least one electronic display device accessible from the exterior of the package,
  a computing unit, intended to receive images from the image sensor and to transmit to the electronic display device instructions to display said images,
  means for triggering the image sensor,
  characterized in that the trigger means are presented on an external facade of the package and in that the computing unit is connected to the detection device and is parameterized to authorize a display, by the display device, of the images from the image sensor in the closed package configuration and, conversely, prohibit the display in the open package configuration.

Thus, it is understood that, thanks to the invention, it is no longer necessary to open a package to check its contents or to obtain a simple visual overview thereof.

Indeed, it clearly emerges from the characteristics of the invention that it suffices for a person to order an image capture of the contents, this by actuating the means for triggering the sensor of images accessible from the exterior of the package, leading to obtaining an image also visible from the exterior of the package on the electronic display device.

On the assumption that the package is stored inside a routing platform, and present in a stack of packages, an operator who has to pick the package can verify the contents without having to manipulate the package to release it from the stack in which the package is present. The order of the image capture and the display of the image obtained on the display device allow the operator to know that he is in the presence of the correct package to be picked and can therefore usefully proceed to its withdrawal from the stack of packages. Conversely, if he finds that the contents are not those of the package he is looking for, he avoids a manipulation of the package and, consequently, the corresponding physical effort as well as a time saving.

Still in the case of packages present in a warehouse or in a store, the operator, by proceeding as described above, can also make an easy and quick inventory of his stock.

In the context of private use, that is to say in the case where the package is available to an individual, the latter can easily check the contents of the package without having to re-open it.

In the case of receipt of the package, the individual can monitor the contents of the package and check that it is indeed intended for him, this always without opening the package. In case of error in the contents, a return to the sender can be undertaken without even the package having been opened.

According to one advantageous solution, the display device comprises means for maintaining displayed images in an uninterrupted closed configuration.

In this way, not only can a person see the contents of the package without opening it, this through the display of the contents on the display device, but he can also subsequently view the contents displayed on the display device without having to again order the triggering of the image capture.

It follows that, in the context of a stack of packages according to the invention, once the image capture has been ordered on all the packages of the stack, a person can easily and quickly view the contents of each package at a glance. He then has a sort of wall of images.

In this case, the display device is preferably of the electronic paper type.

Such a display means allows, in a known manner, maintaining a display without having to exert any specific action on the package, with the advantage of requiring only very low or even zero energy consumption.

According to one preferred solution, the computing unit is parameterized to transmit to the display device a reset instruction, in an open package configuration detected following a closed package configuration.

According to this characteristic, the display of an image provided by the image sensor is only allowed in a closed package configuration. In other words, it is not possible for a person to tamper with the display of the contents, for example by ordering the display of the contents and then replacing the contents with other contents.

According to one preferred embodiment, the computing unit is parameterized to neutralize the trigger means in the open package configuration.

Thus, not only is the display not possible when the package is open, but it is also not even possible to activate, and therefore trigger, the image sensor. People fearing that the package may take and store images of them without their knowledge when the package is opened can thus be reassured.

According to one advantageous solution, the package comprises means for illuminating the object(s), the computing unit being parameterized to activate the illumination means during an image capture by the image sensor.

Thus, it is possible to increase the sharpness and quality of the image taken by the image sensor.

Advantageously, the electronic display device is presented on one face of the package called the display face, the trigger means also being presented on the display face.

Thus, the means for triggering the image capture and the display device are presented on the same external face of the package. It is therefore understood that, according to this characteristic, when a certain number of packages are stored in a stacked manner, it suffices to arrange the packages by presenting them all with the display face on the same side, the triggering of the image capture can then be carried out without having to move and/or manipulate each package.

According to one advantageous solution, the package comprises communication means, the computing unit being parameterized to emit, to a remote unit via the communication means, first data containing the image(s) taken by the image sensor.

In this way, in addition to having an image on the external facade of each package, it is also possible to have information on the contents remotely from the packages, with particularly an image of the contents.

In this case, the computing unit is parameterized to emit second data to a remote unit, including:
- a temperature in the package;
- a weight of the object(s);
- a degree of humidity in the package;
- a pressure in the package;
- a shock on the package;
- a signal for opening the traveling package;
- a $CO_2$ concentration.

Thus, it is possible to check for some types of visualized objects that their physical integrity is preserved. This is the case, for example, if the object(s) contained in the package concern foodstuffs or pharmaceutical products for which some preservation and/or transport conditions must be met.

In this case, according to one possible variant, the package comprises at least one sensor of the second data.

According to another possible variant, the package comprises means for entering and recording the second data by the computing unit.

Other characteristics and advantages of the invention will appear more clearly upon reading the following description of one preferred embodiment of the invention, given by way of a simple illustrative and non-limiting example, and the appended drawings among which:

FIG. 1 illustrates a package according to the invention, in an open configuration;

FIG. 2 is a partial view of an internal wall of the package;

Figure 3:
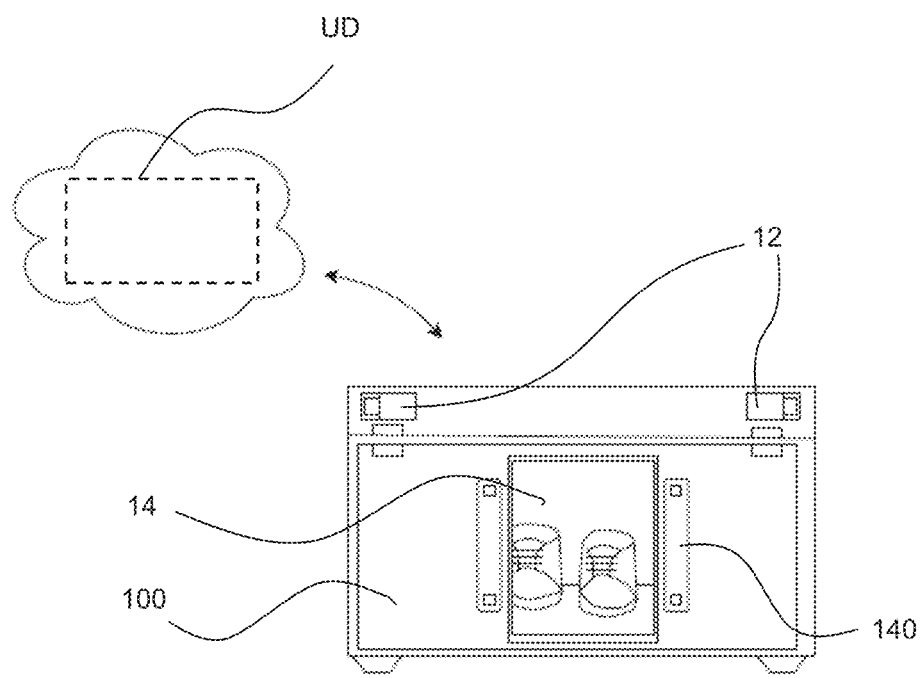
FIG. 3 illustrates a package according to the invention in a front view.
Figure 4:
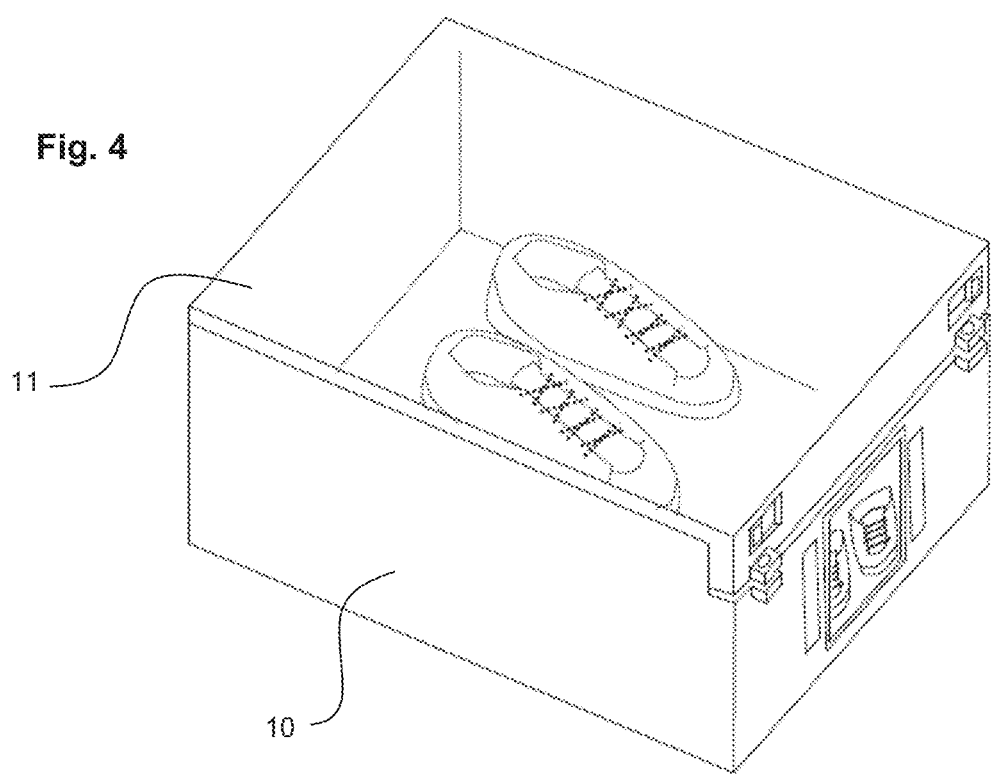
FIG. 4 illustrates a package according to the invention, in a closed configuration.

As illustrated by FIGS. 1 to 4, a package 1 according to the invention, intended to contain at least one object O, is of the type comprising:
- a box 10 delimiting a receiving volume intended to accommodate one or several object(s) O;
- a lid 11, connected or not to the box 10, and which can adopt, with the box, a closed package configuration (FIG. 4) or an open package configuration (FIG. 1);
- a device 12 for detecting the closed or open package configurations;
- at least one image sensor 13, relating to said object(s);
- at least one electronic display device 14 accessible from the exterior of the package;
- a computing unit 15, intended to receive images from the image sensor and to transmit to the electronic display device instructions to display the images;
- means 140 for triggering the image sensor.

The device 12 for detecting the closed or open package configurations can be obtained using sensors (switch or hall) placed in the locking handles (located in the upper part of the facade) and connected to the processing unit.

The image sensor can for its part be constituted by a digital camera, mounted in a corner of the internal volume of the package, so as to provide an overview of the contents present in the package.

According to the principle of the invention, the trigger means 140 are presented on an external facade 100 of the package so that, while the image sensor is presented in the internal volume delimited in the box 10, the means for triggering the capture of images by the image sensor is for its part present outside the package.

In addition, the computing unit 15 is connected to the detection device 12 and is parameterized to authorize a display, by the display device 14, of the images of the image sensor 13, in the closed package configuration.

In other words, with a package according to the invention, the image capture is not authorized, and even made impossible, as long as the package is not perfectly closed. Thus, any invasion of privacy is avoided: people who might fear that a photo of them will be taken by the package without their knowledge or in an involuntary or unwanted way are ensured that such a situation cannot be deplored.

According to the embodiment described above, the electronic unit 15 is therefore electrically connected to the device for detecting the closed or open configurations, which allows it to transmit to the electronic unit an electrical signal for opening the package or, on the contrary, a signal for closing the package.

The electronic unit 15 is also electrically connected to the trigger means 140, which allows it to transmit to the electronic unit a signal for triggering the image capture.

The electronic unit 15 is also electrically connected to the image sensor 13, to:
transmit an image capture instruction when the electronic unit has received from the trigger means 140 a signal for triggering an image capture;
receive in return data relating to the image(s) taken by the image sensor.

The electronic unit 15 is also electrically connected to the electronic display device, to transmit instructions to display the images, associated with the data relating to the image(s) taken, the electronic unit being programmed to transmit these instructions to the display device only if, at the same time, the electronic unit has received a closing signal from the detection device. Therefore, conversely, if the electronic unit has received an open package configuration signal from the detection device, it does not transmit any display instructions to the display device, with the possible exception of an "unauthorized display" message.

According to the present embodiment, the display device is of the electronic paper type, such a display device constituting means for maintaining the displayed images in an uninterrupted closed package configuration.

In addition, the computing unit 15 has one or both of the following characteristics:
it is parameterized to transmit a reset instruction to the display device as soon as an open package configuration is detected, following a closed package configuration;
it is parameterized to neutralize the trigger means in the open package configuration.

Thus, when the display device is of the electronic paper type, the image taken after closing the package is preserved on the electronic paper as long as the package is not reopened, while the image present on the electronic paper is erased as soon as the package is opened.

Furthermore, illumination means 16 are mounted on at least one internal wall of the package. These illumination means are activated by the computing unit, the latter being parameterized to trigger the illumination means during an image capture by the image sensor. Thus, the illumination means are triggered like a flash.

As shown in FIGS. 1 and 3, the electronic display device 14 is presented on an external face of the package (referred to as "display face" 100), and the trigger means 140 are also present on the display face 100.

The trigger means 140 can be constituted by any possible means, such as a mechanical button or a predefined area on a touch screen.

According to another possible characteristic of the invention, the package comprises communication means 17. In addition, the computing unit is parameterized to emit, via the communication means 17, to a remote unit UD, first data containing one or several of the images taken by the image sensor.

Using the communication means, the computing unit can also be parameterized to emit, to a remote unit, second data including the temperature in the package, the weight of the contents of the package, a degree of humidity in the package, a pressure in the package, a shock on the package, a signal for opening the package, a $CO_2$ concentration.

These second data can be measured via one or several sensor(s) 18 of the second data. It is also possible for these second data to be entered manually, the package then comprising means 141 for entering and recording the second data by the computing unit 15. However, for reasons of security and protection against fraud, the manual entry of the sensor data contained in the package will preferably be made impossible.

Insofar as the package according to the invention is provided with communication means, an advanced use mode can be implemented. Indeed, in the context of an implementation of the invention in a logistics platform or in a store, or more generally in a storage area for a plurality of packages according to the invention, a computing unit can be parameterized to emit image capture requests to each package and to collect the images corresponding to each package, as well as complementary data such as those listed above, this to constitute an inventory or, more simply, to allow remote visual monitoring of the contents of the packages.

The invention claimed is:

1. A shipping package intended to contain at least one object, comprising:
    a box;
    a lid which can adopt, with the box, a closed package configuration or an open package configuration,
    a device for detecting the closed or open package configurations,
    at least one image sensor relating to said object(s),
    at least one electronic display device accessible from the exterior of the package,
    a computing unit, intended to receive images from the image sensor and to transmit to the electronic display device instructions to display said images,
    means for triggering the image sensor,
    wherein the trigger means are presented on an external facade of the package and in that the computing unit is connected to the detection device and is parameterized to authorize a display, by the display device, of the images from the image sensor in the closed package configuration and, conversely, prohibit the display in the open package configuration and wherein the computing unit is parameterized to neutralize the trigger means in the open package configuration.

2. The shipping package according to claim 1, wherein the display device comprises means for maintaining displayed images in an uninterrupted closed configuration.

3. The shipping package according to claim 2, wherein the display device is of the electronic paper type.

4. The shipping package according to claim 1, wherein the computing unit is parameterized to transmit to the display device a reset instruction, in the open package configuration detected following the closed package configuration.

5. The shipping package according to claim 1, wherein it comprises means for illuminating the object(s), and in that the computing unit is parameterized to activate the illumination means during an image capture by the image sensor.

6. The shipping package according to claim 1, wherein the electronic display device is presented on one face of the package called the display face, the trigger means also being presented on the display face.

7. The shipping package according to claim 1, wherein it comprises communication means, the computing unit being parameterized to emit, to a remote unit via the communication means, first data containing the image(s) taken by the image sensor.

8. The shipping package according to claim 1, wherein the computing unit is parameterized to emit second data to a remote unit, including:
- a temperature in the traveling package;
- a weight of the object(s);
- a degree of humidity in the traveling package;
- a pressure in the traveling package;
- a shock applied to the traveling package;
- a signal for opening the traveling package;
- a $CO_2$ concentration.

9. The shipping package according to claim 8, wherein it comprises at least one sensor of the second data.

10. The shipping package according to claim 8, wherein it comprises means for entering and recording the second data by the computing unit.

\* \* \* \* \*